(12) United States Patent
Rathmann et al.

(10) Patent No.: US 12,350,796 B2
(45) Date of Patent: Jul. 8, 2025

(54) CLAMPING SYSTEM FOR THE FLEXIBLE PRODUCTION OF LITHIUM-ION BATTERIES

(71) Applicant: VOLKSWAGEN AKTIENGESELLSCHAFT, Wolfsburg (DE)

(72) Inventors: Sven Rathmann, Braunschweig (DE); Kai Stühm, Braunschweig (DE); Alexander Tornow, Ummern (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 736 days.

(21) Appl. No.: 16/656,924

(22) Filed: Oct. 18, 2019

(65) Prior Publication Data
US 2020/0122301 A1     Apr. 23, 2020

(30) Foreign Application Priority Data

Oct. 22, 2018   (DE) .................... 10 2018 126 225.6

(51) Int. Cl.
*B25B 5/10*     (2006.01)
*B25B 11/00*    (2006.01)
(Continued)

(52) U.S. Cl.
CPC .............. *B25B 5/109* (2013.01); *B25B 11/00* (2013.01); *H01M 10/0404* (2013.01);
(Continued)

(58) Field of Classification Search
CPC ................................................ H01M 10/0468
See application file for complete search history.

(56) References Cited

U.S. PATENT DOCUMENTS

| | | | |
|---|---|---|---|
| 2009/0166116 A1* | 7/2009 | Kiya | H01M 50/209 180/68.5 |
| 2009/0188099 A1 | 7/2009 | Keyser et al. | |

(Continued)

FOREIGN PATENT DOCUMENTS

| | | | |
|---|---|---|---|
| AT | 514 595 A4 | | 2/2015 |
| CN | 204255553 | * | 4/2015 |

(Continued)

OTHER PUBLICATIONS

Machine English translation of CN207969087U originally published to Jiang Oct. 12, 2018 (Year: 2018).*

(Continued)

*Primary Examiner* — Ula C Ruddock
*Assistant Examiner* — Mary Grace Byram
(74) *Attorney, Agent, or Firm* — PEARL COHEN ZEDEK LATZER BARATZ LLP

(57) ABSTRACT

A clamping system for fixing in position a stack of electrode foils for the downstream manufacturing of battery cells, including a base plate, a pressure plate, at least two clamping elements and a receiving region for receiving the stack between the base plate and the pressure plate, the clamping elements clamping together the base plate and the pressure plate in a way that enables the electrode foils to be fixed in position in the receiving region, the clamping elements being located in the edge regions of the respective long sides of the plates outside of the receiving region, and/or the base plate and the pressure plate each having a plurality of, however, at least two, attachment points for connecting the clamping system to apparatuses of the downstream battery cell production in that the attachment points of a particular plate are differently embodied in the shape or size thereof.

1 Claim, 5 Drawing Sheets

(51) Int. Cl.
  *H01M 10/04* (2006.01)
  *H01M 10/0525* (2010.01)
  *H01M 10/058* (2010.01)
  *H01M 50/105* (2021.01)

(52) U.S. Cl.
  CPC ... *H01M 10/0468* (2013.01); *H01M 10/0481* (2013.01); *H01M 10/049* (2013.01); *H01M 10/0525* (2013.01); *H01M 10/058* (2013.01); *H01M 50/105* (2021.01); *H01M 10/0413* (2013.01); *H01M 2220/20* (2013.01)

(56) References Cited

U.S. PATENT DOCUMENTS

| | | | |
|---|---|---|---|
| 2011/0117418 A1 | 5/2011 | Meintschel et al. | |
| 2011/0189527 A1* | 8/2011 | Michelitsch | H01M 10/6568 429/123 |
| 2012/0156537 A1 | 6/2012 | Meintschel et al. | |
| 2021/0151835 A1* | 5/2021 | Park | H01M 50/517 |

FOREIGN PATENT DOCUMENTS

| | | | | |
|---|---|---|---|---|
| CN | 204255553 U | * | 4/2015 | |
| CN | 205609622 U | | 9/2016 | |
| CN | 207309963 U | | 5/2018 | |
| CN | 108281685 A | | 7/2018 | |
| CN | 207969087 U | | 10/2018 | |
| DE | 10 2007 063 181 A1 | | 2/2009 | |
| DE | 10 2008 010 814 B4 | | 8/2009 | |
| DE | 10 2009 006 296 B4 | | 10/2009 | |
| DE | 10 2011 109 237 A1 | | 2/2013 | |
| DE | 10 2016 200 496 A1 | | 7/2017 | |
| EP | 1530247 A2 | | 5/2005 | |
| EP | 2 605 306 A2 | | 6/2013 | |
| EP | 3121868 A1 | * | 1/2017 | ........ H01M 10/0481 |
| WO | WO 2010/037796 | | 4/2010 | |

OTHER PUBLICATIONS

Search report for German Patent Application No. 10 2018 126 225.6, mailed Sep. 20, 2019.

* cited by examiner

CLAMPING SYSTEM FOR THE FLEXIBLE PRODUCTION OF LITHIUM-ION BATTERIES

FIELD OF THE INVENTION

The present invention relates to a clamping system for the flexible production of lithium-ion batteries, in particular what are generally referred to as pouch cells, which are especially used as traction batteries in electric vehicles.

BACKGROUND OF THE INVENTION

Lithium-ion traction batteries are known from the related art. They include battery cells having a stack of positive and negative electrodes, as well as separators disposed therebetween; in each particular case, the electrodes having electrode tabs that are welded to at least one positive and negative shunt. This structure is typically surrounded by an insulating material. The electrodes each have electrode tabs, which extend out from the stack of the electrodes and are connected, typically welded to a shunt, also referred to as collector. With regard to this design, reference is made exemplarily to the German Patent Application DE 10 2011 109 237 A1. The design is such that the electrode tabs of the one pole and of the other pole extend separately from one another out of the stack of positive and negative electrodes and the separators disposed therebetween.

In the case of rectangular cell formats, such as PHEV-1 cells, some advantages are derived from stacking, instead of winding the electrode foils. The result is a very homogeneous structure of the cell stack and a better utilization of the housing space. For that reason, there is an improvement in the cell capacity, durability and reliability over wound lithium-ion cells. However, the single-sheet stacking method also entails disadvantages: One of these is the low throughput in currently available mass production systems. It is lower by a factor of two to six than winding methods. Moreover, due to form instability, the precision required for the ultra-fast stacking of the individual electrode sheets presents an enormous challenge when working with large-size cells.

In battery manufacturing, clamping systems are known in connection with flat battery cells. However, this is a different process stage. These clamping systems are used to combine already finished pouch battery cells into stacks of a plurality of cells. Thus, the Unexamined German Laid-Open Patent Application 10 2016 200 496 A1 describes such a clamping system that clamps a stack of finished battery cells between two pressure plates with the aid of clamping jaws to hold the stack during the banding process. The banded stack can subsequently be unclamped. In addition, in the edge region thereof, the clamping apparatus of the German Patent Application DE 10 2016 200 496 A1 has recesses into which a gripper of a robot can engage, in order to place the clamped stack into the banding apparatus and remove it again.

However, not all clamping systems for banding finished battery cells known under the related art are able to be readily used in the upstream production stage of manufacturing the individual battery cells by stacking the electrode foils. In particular, there is a substantial difference among the requirements for linking the various manufacturing stations and the sensitivity of the objects to be held. For example, the related-art type of clamping using clamping jaws, which are connected to a spring or a different clamping element underneath the stack holder, would not be suited in the mass production of individual cells from electrode stacks.

A flexible approach is, in fact, using a gripping system to fix the battery cell stack in position. However, it has the disadvantage of requiring that the subsequent steps be carried out in the immediate vicinity of the gripping handling system. This is disadvantageous for a cycle time-optimized production of the battery cell since the handling system is blocked for all downstream manufacturing steps.

It is, therefore, an object of the present invention to provide a novel clamping system for holding together and further processing the electrode stacks to improve throughput speed and achieve a reliable precision in the mass production of individual battery cells of the species.

SUMMARY OF THE INVENTION

The objective is achieved in accordance with the present invention by a clamping system having the features as claimed.

The present invention includes a clamping system for fixing in position a stack of electrode foils for the downstream manufacturing of battery cells and includes a base plate, a pressure plate, at least two clamping elements and a receiving region for receiving the stack between the base plate and the pressure plate, the clamping elements clamping together the base plate and the pressure plate in a way that enables the electrode foils to be fixed in position in the receiving region.

In accordance with the present invention, the clamping elements are located in the edge regions of the respective long sides of the plates outside of the receiving region.

Using the clamping system according to the present invention, all steps may be advantageously performed in an automatable way for the first time using a single retention system. Beginning with the formation of the electrode foil stack, it is ensured that the position of the stack is precisely retained for the downstream processing steps. The clamping system of the present invention features a simple design and rapid usability, in particular with regard to the mass production of individual pouch batteries.

In adaptation to the generally rectangular shape of the electrode foils, both the base plate, as well as the pressure plate of the inventive clamping system have an essentially rectangular form. Therefore, the two plates each have two short and two long sides. The plates are dimensioned to extend in sections, by the long sides thereof, beyond the electrode foils. In the edge regions of the long sides, corresponding receiving recesses for the clamping elements are provided in the plates. Depending on the embodiment of the clamping elements, they may be through holes, locating holes or projections, for example. In the inventive clamping system, it is provided that the base plate first be made available, upon whose receiving region, the electrode foils may be stacked in a suitable orientation in an automated process. The pressure plate is then placed on the electrode foil stack in a way that locates the stack in the receiving region and aligns the recesses located in the edge region of the long sides for the clamping elements with those of the base plate. The clamping elements may then be applied using the appropriate force and clamped. The thus loaded clamping system may then perform the various, downstream manufacturing steps until the sealing foils are ultimately placed and welded. The manufacturing steps may include welding shunt tabs, high-potential testing, banding, drying and/or sealing the individual cell in a sealing foil.

In an embodiment of the present invention, the clamping elements are designed to enable the electrode foil stack to be fixed in position at different heights. This may be achieved by clamping elements that include a screwing together using a variable, defined torque, respectively a variable two- or multistage displacement-limited application. Alternatively, a clamping element may be used, which provides a retaining clip, knee lever or clamping lever in various heights or provides a multi-stage bayonet system.

This makes it possible to ensure a usability of the clamping system in all manufacturing apparatuses, as well as a full function integration in the automated production. Stacks of electrode foils may also be further processed in different thicknesses.

In a specific embodiment of the present invention, the clamping elements may preferably include screws, bolts, clamps, bayonet elements or elastic straps. The fastening means may be adapted to the requirements of and already present means in the automated production, achieving a simple integration in existing systems.

In another embodiment of the clamping system according to the present invention, the clamping elements, such as screws or bolts, for example, are located in bushings. The susceptibility to errors upon introduction and removal of the clamping system may be minimized, in particular with regard to the sensitivity of the electrode foils to be handled.

In another preferred specific embodiment of the present invention, the clamping elements may each include a tension spring that is disposed between the base plate and the pressure plate. The tension spring may be embodied as a spiral spring or disk spring, for example. It may be used for defining a preferred intermediate space and, consequently, a preferred stack thickness, respectively a defined pressure in the receiving region between the two plates. This makes it possible to prevent damaging the sensitive electrode foils in the stack.

The present invention also encompasses a clamping system for fixing in position a stack of electrode foils for the downstream battery cell manufacturing and includes a base plate, a pressure plate, at least two clamping elements and a receiving region for receiving the stack between the base plate and the pressure plate, the clamping elements clamping together the base plate and the pressure plate in a way that enables the electrode foils to be fixed in position in the receiving region.

In accordance with the present invention, the base plate and the pressure plate each have a plurality of, however, at least two attachment points for connecting the clamping system to apparatuses of the downstream battery cell production in that the attachment points of a particular plate are differently embodied in the shape or size thereof.

In accordance with the present invention, the attachment points for connecting the clamping system to apparatuses of the downstream battery cell production are differently formed in each case on the base plate and the pressure plate in order to reliably prevent a faulty handling upon connection to the various manufacturing apparatuses. Such an error-preventing differentiation is also referred to as "poka yoke." For example, the inventive attachment points of the present invention may be embodied as differently shaped or sized through holes. Relative to the longitudinal center plane thereof, the base plate and/or the pressure plate are designed to be mirror-symmetric. This makes it possible for the base plate and/or the pressure plate to be used at a rotation of 180° about the longitudinal axis thereof. Thus, the longitudinal center plane forms a plane of symmetry. The attachment points preferably reside in the plane of symmetry. However, there are also a multiplicity of other ways to achieve the inventive differentiation of the attachment points. This is exemplified by differently formed projections or bolts. The attachment points may be used to precisely position the stack in a manufacturing apparatus.

Thus, the clamping system according to the present invention, with the aid of the integrated recesses and, in particular the attachment points, which function as adjustment devices, allows an exact adding and/or processing without repeated determination of the position of the stack.

In another embodiment of the clamping system according to the present invention, the clamping elements are located in the edge regions of the respective long sides of the plates outside of the receiving region.

This inventive design is highly advantageous for a large-scale production, particularly because a single clamping system for the electrode foil stack makes it possible to automate the manufacturing processes in a fail-safe manner, especially due to the combined configuration of the clamping elements and the different attachment points.

In an embodiment of the inventive clamping system, the clamping elements are designed to enable the electrode foil stack to be fixed in position at different heights. This advantageously benefits the flexibility of the clamping system, in different manufacturing facilities as well, and with respect to different thicknesses of the battery cells to be manufactured.

An embodiment of the clamping system according to the present invention provides that the base plate and the pressure plate have recesses for fixing the stack in position. The recesses are used for affixing stack fasteners, for example, tapes. The recesses are used as access points for taping the stack. For this purpose, they extend into the area of the electrode foil.

Generally, the stack of electrode foils is first inserted into an inventive clamping system and fixed in position. Following a possible high-potential testing, the stack is fixed in position in advance using foil strips before a drying and subsequent steps follow. This fixing in position in advance is also referred to as banding. Because of recesses in the edge region of the base plate and the pressure plate in the aforementioned embodiment, the clamping system readily allows this banding without having to be disengaged. Moreover, the recesses in the edge region may be advantageously used in the adjustment process in order to precisely insert the clamping system into the manufacturing apparatuses and also as a reference for the positioning. Not the least, the recesses in the edge region are also useful as a connection for the clamping system for grasping or gripping, for example, for transfer to a next manufacturing station.

The present invention also relates to the use of an inventive clamping system as described above, in particular in the explained embodiments, in the manufacturing of battery cells, in particular for traction batteries of vehicles.

The clamping device may, therefore, be used flexibly and for the manual, partially and fully automated manufacture of Li-ion pouch cells.

BRIEF DESCRIPTION OF THE DRAWINGS

There are many ways to embody and refine the clamping system. For this, reference is first made to the dependent claims. A preferred embodiment of the present invention is described in greater detail below with reference to the drawing and the descriptions pertaining thereto. In the drawing:

DETAILED DESCRIPTION OF THE INVENTION

Figure 1:
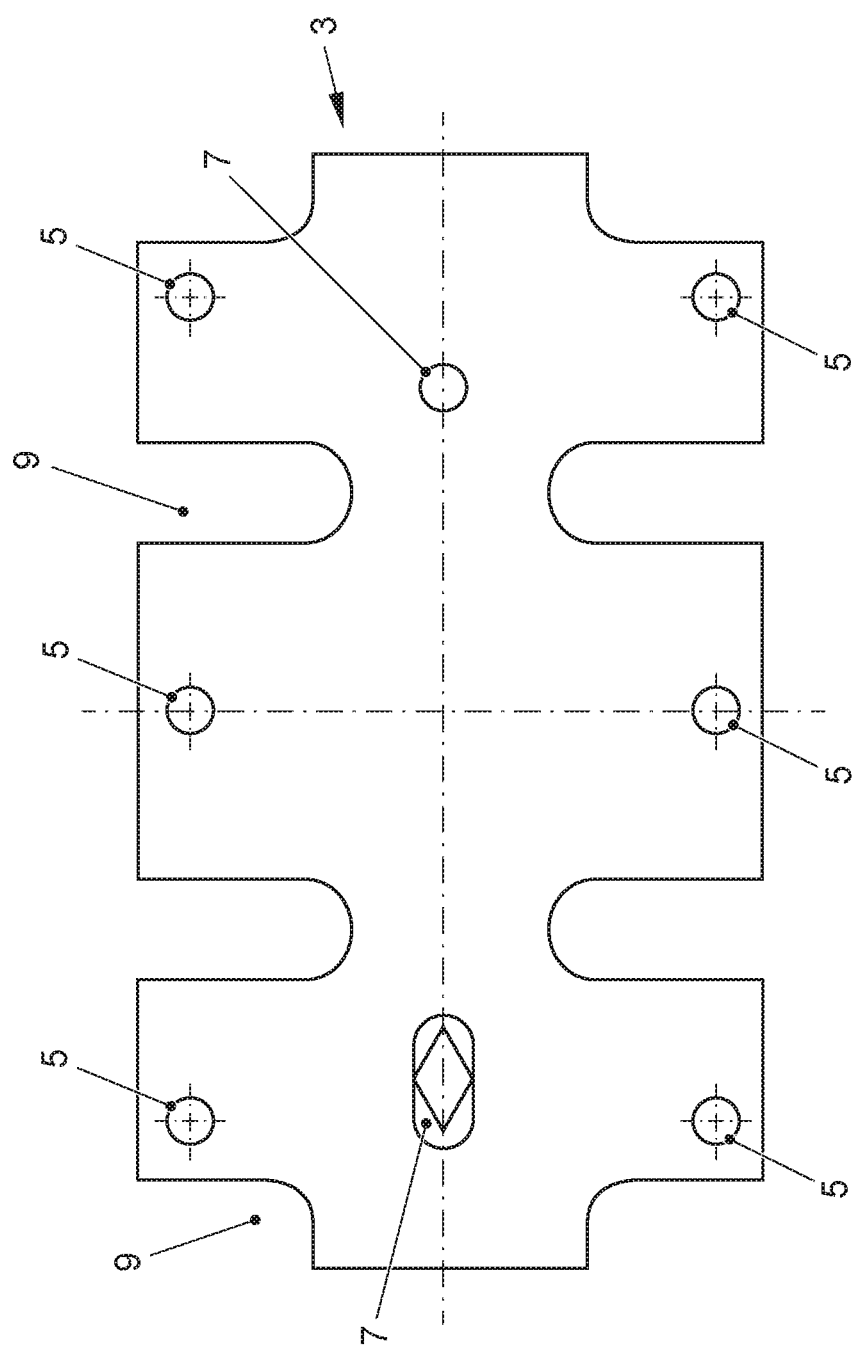
FIG. 1 is a highly schematized representation of a plan view of a base plate of the clamping system according to the present invention.

In a highly schematized plan view, FIG. 1 shows a base plate 3 of a clamping system 1 according to the present invention. Base plate 3 features an essentially rectangular basic shape having short and long sides, respectively. Locating holes, as parts of clamping elements 5, are located in the edge regions of the long sides. In addition, recesses 9 are provided in the edge regions. Recesses 9 are formed as U-shaped sections. Alternatively, the recesses may also have a different shape, such as circular, polygonal, rectangular or the like. For the taping of stack 2, the recesses extend into the area of the electrode foil. In particular, recesses 9 in the edge regions of the short sides may be used as a reference and as points of application for positioning the clamping system in the manufacturing apparatuses provided. Shown in the center in the body of base plate 3 are two attachment points 7, one of which is formed as an elongated hole, and the other as a round hole. They are used as receivers, for example, as bolt-type receivers in the manufacturing apparatuses. Due to the variable form and size thereof, attachment points 7 ensure that a laterally correct orientation is observed upon insertion of inventive clamping system 1 into a manufacturing apparatus, for example, a banding apparatus, a high-potential testing apparatus or a drying apparatus. This prevents the anode side from being interchanged with the cathode side, for example, in automated processes, in particular. In addition, attachment points 7 ensure the exact positioning of stack 2 in the manufacturing apparatus.

Figure 2:
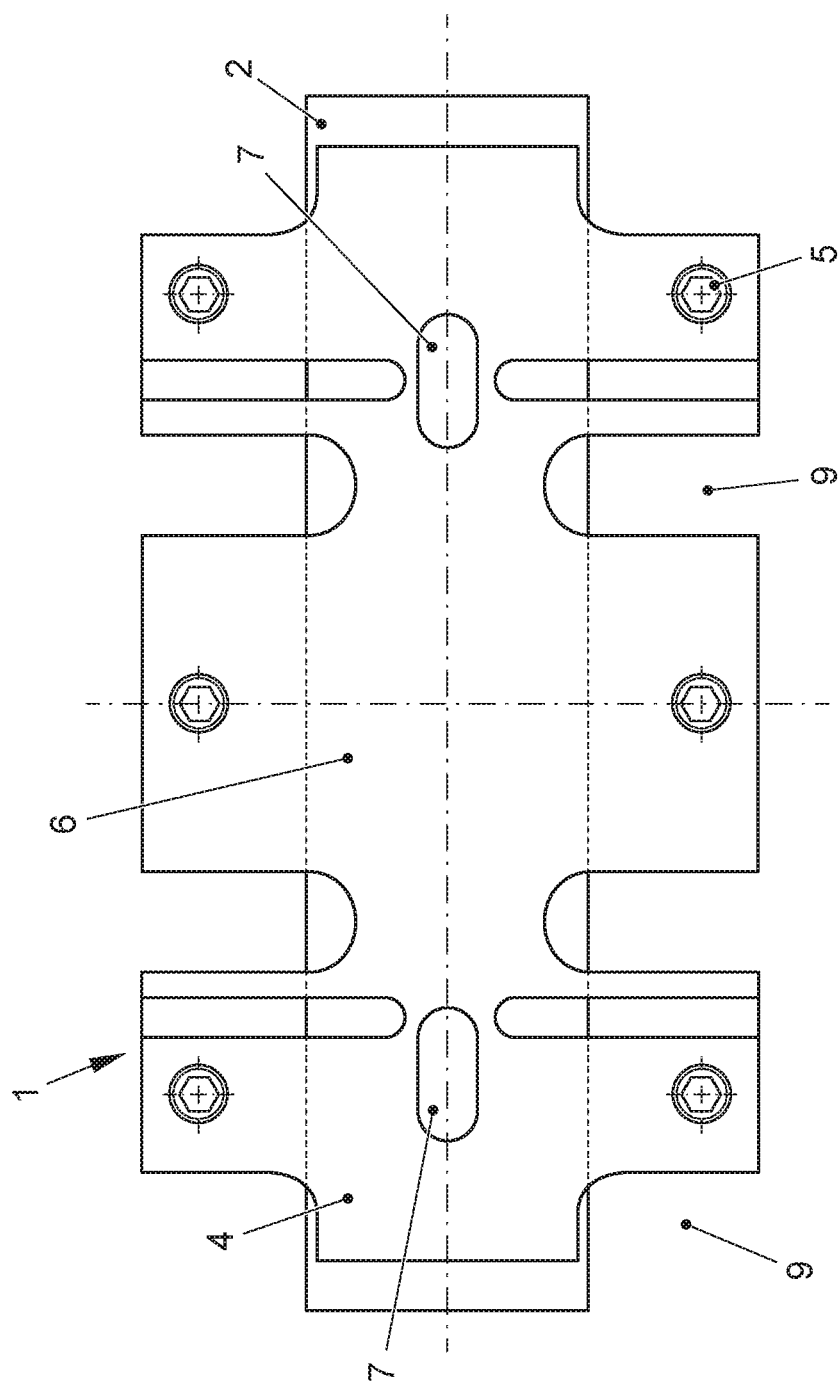
FIG. 2 is a highly schematized representation of a plan view of a pressure plate of the clamping system according to the present invention.

In a highly schematized plan view, FIG. 2 shows a pressure plate 4 of a clamping system 1 according to the present invention. Illustrated pressure plate 4 corresponds to base plate 3 shown in FIG. 1 and, together with base plate 3 of the previous figure, may be used in a clamping system 1 of the present invention. Pressure plate 4 features an essentially rectangular basic shape having short and long sides, respectively. However, other basic shapes, such as polygonal, are also conceivable. Located underneath pressure plate 4 is a stack of electrode foils 2, whose short ends project over the edges of the short sides of pressure plate 4. In the present figure, it is discernible that the devices of clamping elements 5 reside outside of receiving region 6 of pressure plate 4 and also outside of the receiving region of corresponding base plate 3.

As parts of clamping elements 5, locating holes are disposed in the edge regions of the long sides, as in base plate 3. Likewise additionally provided in the edge regions are recesses 9. In correspondence with those of the base plate, recesses 9 are formed as U-shaped sections. Recesses 9 are used for affixing stack fasteners, for example, tapes.

Recesses 9 are used as access points for taping stack 2. Shown in the center in the body of pressure plate 4 are two attachment points 7, one of which is formed as an elongated hole, and the other as a round hole. They are used as receivers, for example, as bolt-type receivers in the manufacturing apparatuses. Due to the variable form and size thereof, attachment points 7 ensure that a laterally correct orientation is observed upon insertion of inventive clamping system 1 into a manufacturing apparatus, for example, a banding apparatus, a high-potential testing apparatus or a drying apparatus. This prevents the anode side from being interchanged with the cathode side, for example, in automated processes, in particular. In addition, attachment points 7 ensure the exact positioning of stack 2 in the manufacturing apparatus.

Figure 3:
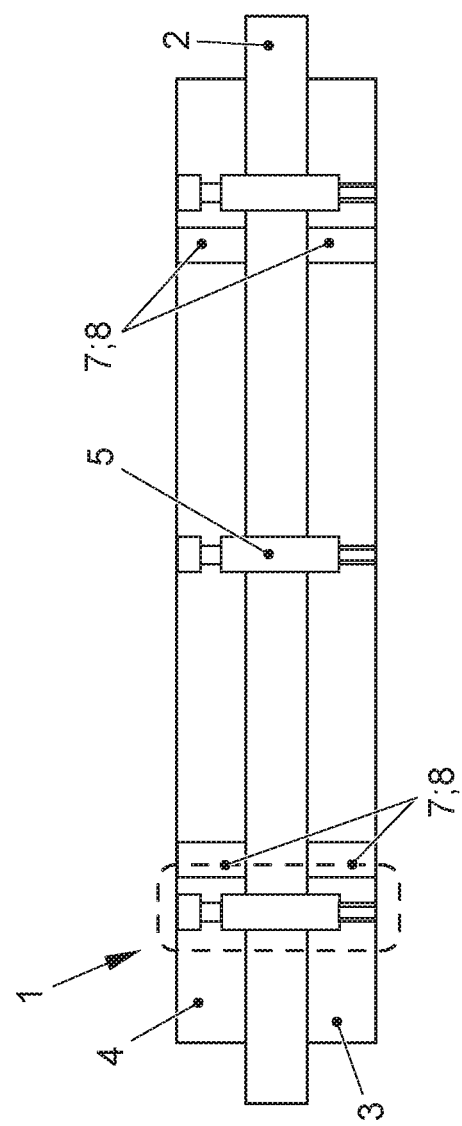
FIG. 3 is a highly schematized, sectional view representation of a detail view of a plate including clamping elements and attachment points.

In a highly schematized, sectional view representation, FIG. 3 shows a detail view of plates 3 and 4 including clamping elements 5 and attachment points 7. A stack of electrode foils 2 is inserted between base plate 3 and pressure plate 4. Clamping elements 5 are provided in the edge regions of the long sides of plates 3 and 4 outside of the region for receiving the electrode stack. Illustrated clamping elements 5 include through holes as locating holes in plates 3 and 4. Inserted through these through holes are screws, which clamp together pressure plate 4 and base plate 5 and, in this manner, fix stack 2 in position therebetween in the receiving region. In addition, base plate 3 and pressure plate 4 each have attachment points 7, which are disposed one over the other, differ in the form and/or size thereof, and are likewise shown here as through holes. Recessed in the through holes of attachment points 7 are bushings 8, which serve as a centering aid for the purpose of receiving correspondingly formed bolts of a manufacturing apparatus (not shown).

Figure 4:
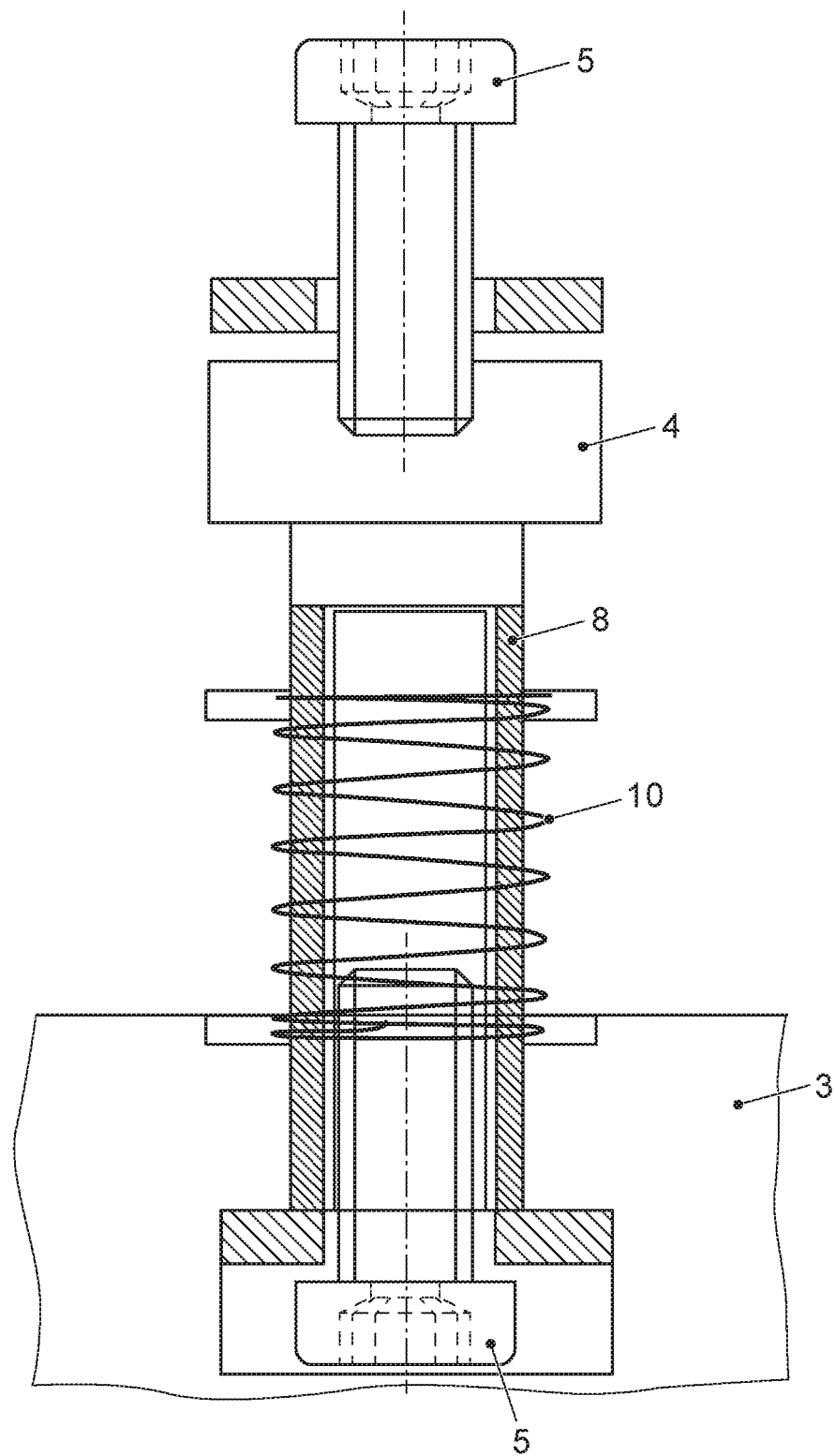
FIG. 4 is a highly schematized, sectional view representation of an enlarged detail view of a clamping element situated in the plates.

In a highly schematized, sectional view, FIG. 4 shows an enlarged detail view of clamping system 1 according to the present invention in another embodiment. Base plate 3 and pressure plate 4 are provided with mutually opposing through holes. As parts of clamping element 5, screws engage into the through holes in each particular case. They are guided in bushings 8. This enables a guided, automated insertion of the screws. In addition, bushings 8 may be used to protect the stack of sensitive electrode foils to be fixed in position between the two plates 3 and 4. Located, moreover, in the intermediate area between the two plates 3 and 4 and around bushings 8, is a tension spring 10. Tension spring 10 may be in the form of a spiral spring or disk spring. Tension spring 10 is held and accommodated in groove-type enlargements of the through holes in the regions of plates 3 and 4 that are inwardly disposed in the mounting state. It may be used to prevent too great of a force from acting on the electrode foils located therebetween and to maintain a predefined space between plates 3 and 4. The process reliability is hereby enhanced once again.

Figure 5:
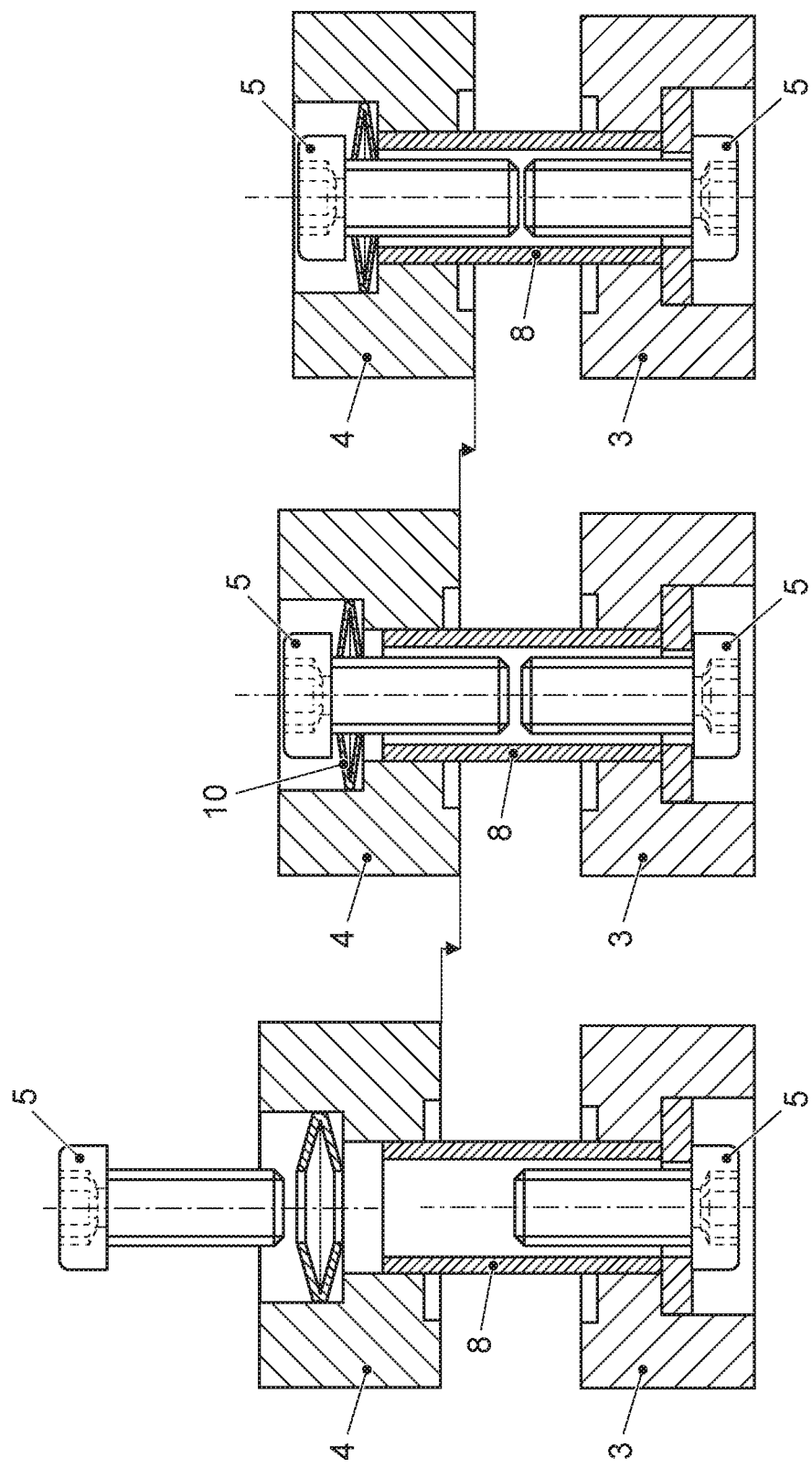
FIG. 5 is a highly schematic representation as a sectional view of an enlarged detail of a further embodiment of a arranged in the plates clamping element.

FIG. 5 is a highly detailed schematic representation of a sectional detail of another possible embodiment of the clamping system 1 according to the invention in an exploded view and shown in two different states of assembly. The base plate 3 and the pressure plate 4 are respectively provided with opposite through holes. In the through holes each engage screws as parts of the clamping element 5a. They are guided in guide sleeves 8. The guide sleeves 8 are slidably supported in the through-holes of the plates. In this way, a guided automated insertion of the screws can be done. The guide sleeves 8 can also serve to protect the stack of sensitive electrode films, which is fixed between the two plates 3 and 4. In the head region of the through holes of the pressure plate 4, a plate spring 10 is also arranged in each case. The plate spring 10 is held and received in corresponding extensions of the through holes of the plate. It can serve to avoid an excessive force acting on the electrode foils to be arranged therebetween and to observe a predefined distance between the plates 3 and 4. This further improves process reliability. In addition, this a space-optimized arrangement is achieved, which also holds the film cell stack at different heights, for example, for transport, as in the center figure, at a certain height and for a high-voltage test at a lower level, as in shown on the right side, which is flexible enough not to press too hard the sensitive foil cells.

One skilled in the art will appreciate that the present invention can be practiced by other than the described embodiments, which are presented for purposes of illustration and not limitation. Further, since numerous modifications and changes will readily occur to those skilled in the art, it is not desired to limit the invention to the exact construction and operation shown and described, and accordingly, all suitable modifications and equivalents may be resorted to, without departing from the scope or spirit of the invention as defined in the appended claims.

REFERENCE NUMERAL LIST

1 clamping system
2 stack of electrode foils
3 base plate
4 pressure plate
5 clamping element
6 receiving region
7 attachment points
8 bushing
9 recesses
10 tension spring

The invention claimed is:

1. A clamping system for fixing in position a stack of electrode foils for the downstream manufacturing of battery cells, comprising:
   a base plate,
   a pressure plate,
   at least two clamping elements and a receiving region for receiving the stack between the base plate and the pressure plate, the clamping elements being configured to clamp together the base plate and the pressure plate such that the electrode foils are fixed in position in the receiving region,
   wherein the base plate and the pressure plate each have a plurality of attachment points configured to connect the clamping system to apparatuses of the downstream battery cell production, such that the attachment points of the base plate are differently embodied in the shape and size thereof,
   wherein the stack is configured to be positioned in a manufacturing apparatus through the use of the attachment points,
   wherein the attachment points function as locating holes and include centering bushings,
   wherein the clamping elements are located in the edge regions of the respective long sides of the plates outside of the receiving region,
   wherein the clamping elements enable the electrode foil stack to be fixed in position at different heights,
   wherein the base plate and the pressure plate have recesses for taping the stack,
   wherein the base plate and the pressure plate are mirror-symmetric relative to the longitudinal center plane thereof, and
   wherein the attachment points reside in the plane of symmetry.

* * * * *